United States Patent [19]

Luttrell

[11] 3,853,231

[45] Dec. 10, 1974

[54] VEHICLE COUNTERWEIGHT APPARATUS
[75] Inventor: Richard W. Luttrell, Morton, Ill.
[73] Assignee: Caterpillar Tractor Co., Peoria, Ill.
[22] Filed: Aug. 21, 1972
[21] Appl. No.: 282,139

[52] U.S. Cl. ............... 214/142, 280/150 E, 212/49
[51] Int. Cl. .............................................. E02f 3/00
[58] Field of Search ...... 214/142, 106, 127; 212/49, 212/48; 280/150 E, 150 D

[56] References Cited
UNITED STATES PATENTS
2,526,613  10/1950  Tanguy ................................ 212/49
2,820,556  1/1958   Davis .............................. 280/150 E
3,003,785  10/1961  Straszheim ...................... 280/150 E
3,490,787  1/1970   Latterman ....................... 280/150 E
3,533,524  10/1970  Wilcox ............................... 214/142

Primary Examiner—Robert J. Spar
Assistant Examiner—John Mannix
Attorney, Agent, or Firm—Phillips, Moore, Weissenberger Lempio & Strabala

[57] ABSTRACT

The frame of a vehicle has a rearward opening into which a counterweight may be positioned and through which the counterweight may be removed. Support members and forward stop members are associated with the frame to support the counterweight and limit its relative forward movement respectively. In such forward position, the counterweight may be secured relative to the frame. A second counterweight may be fitted to the rear of the frame over the opening to limit removal of the first-mentioned counterweight from the frame. Upper members are associated with the frame to act upon the top portion of the first counterweight to keep it from falling under its own weight while it is being only partially supported by the support means (i.e., as it is being fitted into or removed from the frame). The second counterweight further defines hitching means for towing purposes.

4 Claims, 3 Drawing Figures

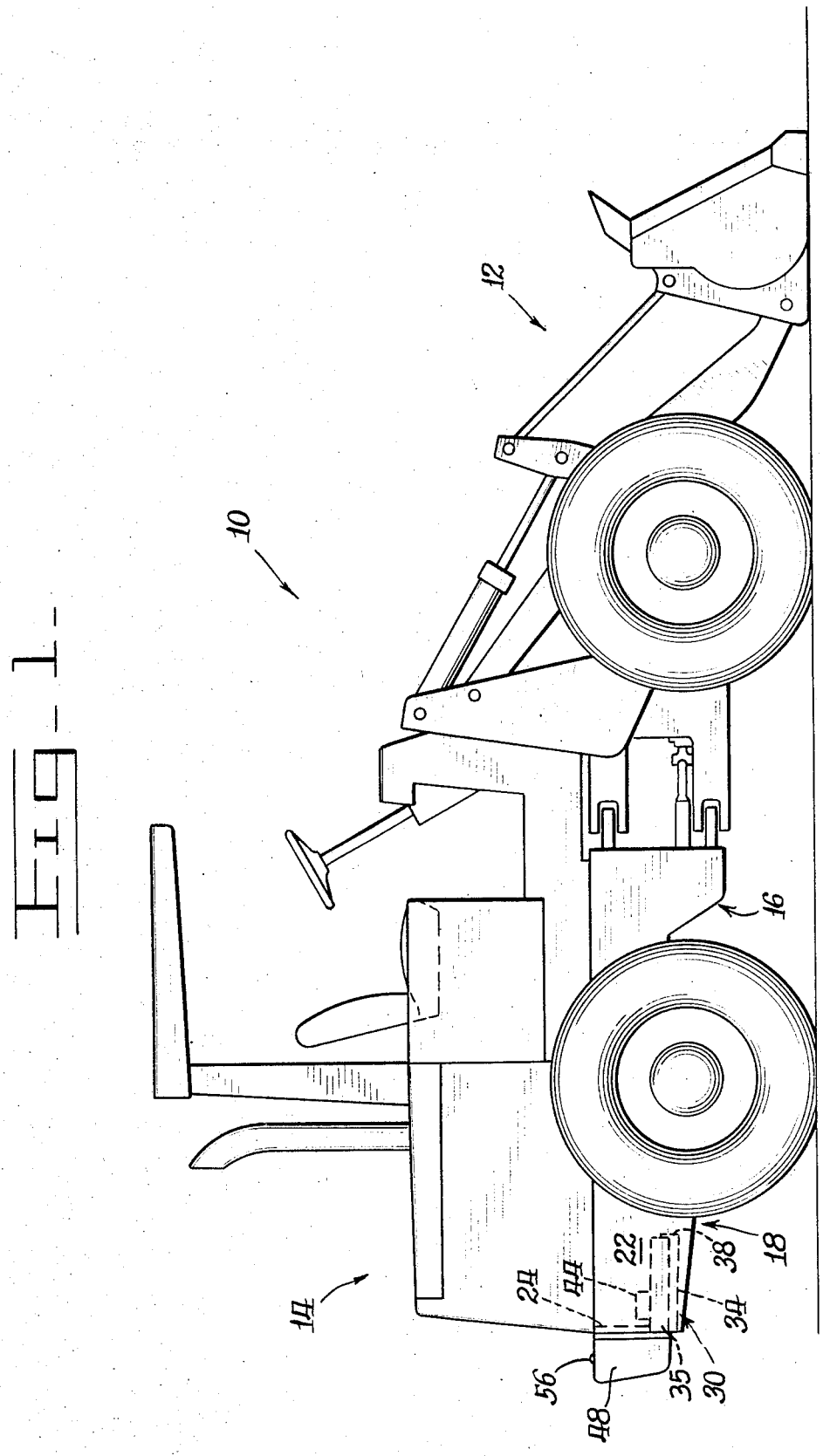

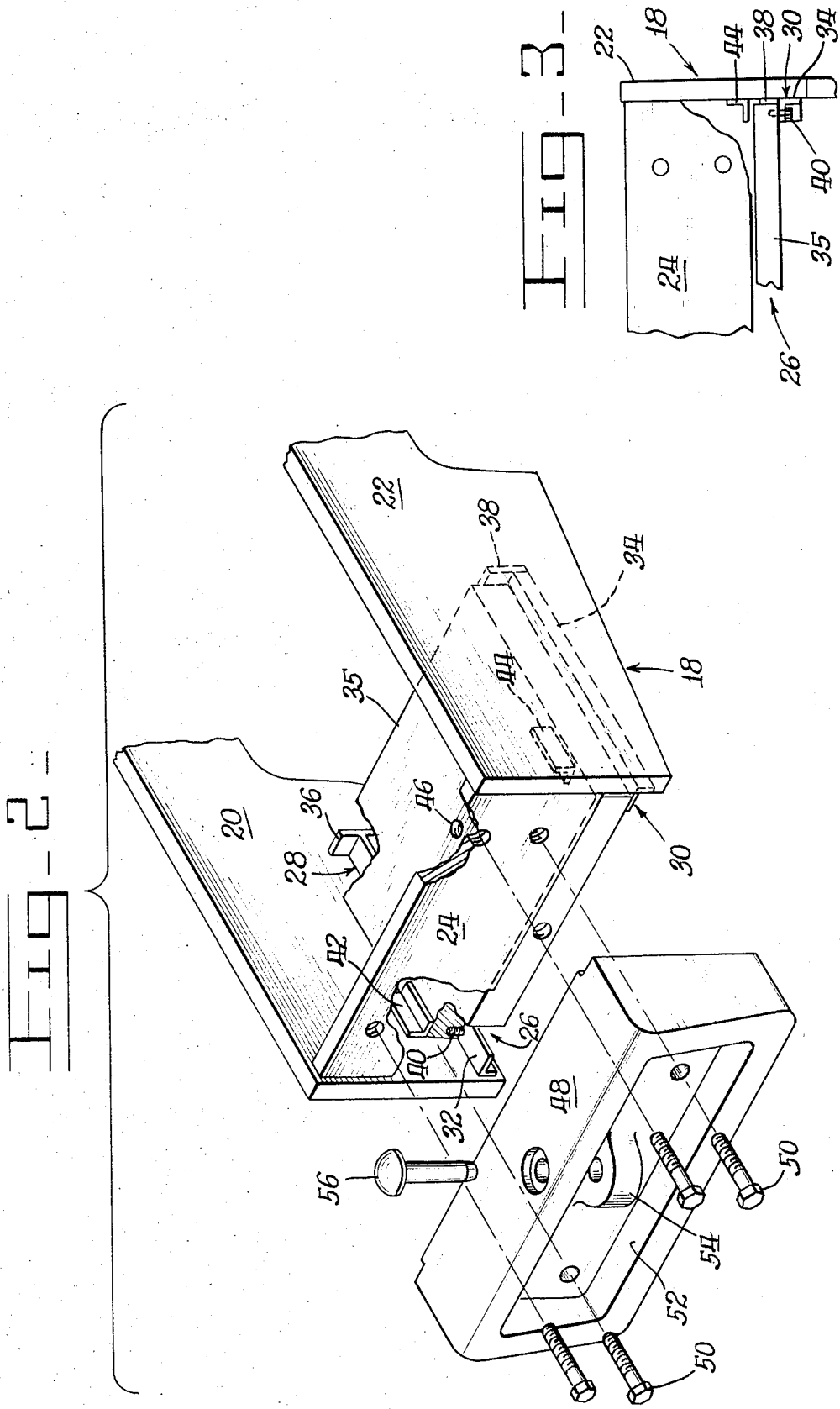

VEHICLE COUNTERWEIGHT APPARATUS

BACKGROUND OF THE INVENTION

This invention relates to vehicle counterweight means, and more particularly, to a system of multiple, removable counterweights.

Many work vehicles such as fork trucks, tractor shovels, and other construction machinery, utilize counterweights to increase the lifting and/or carrying capacity of the vehicle. In such vehicles, the counterweight means are arranged adjacent one end of the vehicle in order to counterbalance load-engaging means at the opposite end.

Such a counterweighting system should, if possible, fulfill a number of requirements. Firstly, the counterweight means should be completely removable from the vehicle, to lighten the weight of the vehicle for transport over highways or by air. Furthermore, in some uses of the vehicle, it may be advantageous to exclude such counterweight means. Secondly, such systems should provide a degree of variation of the weight applied, depending on the function of the vehicle. Thirdly, such a system should provide means for carrying counterweight means safely and stably, and should insure that the counterweight means may be fitted to and removed from the vehicle in safety.

Various vehicle counterweighting systems are, of course, known (see, for example, U.S. Pat. No. 2,967,718 to Orwig, U.S. Pat. No. 2,526,613 to Tanguy, and U.S. Pat. No. 3,533,524 to Wilcox). However, each of these systems has drawbacks which limit its utility. In Tanguy, for example, neither counterweight is designed to be removable from the vehicle. Rather, each is an integral part of the vehicle itself. Consequently, the counterweights cannot be conveniently removed to lighten the vehicle weight, the desirability of which is pointed out above. In Orwig and Wilcox, the counterweights utilized are, indeed, removable from the vehicle. But it will be seen that Orwig provides a system for a single counterweight which hangs from the vehicle frame below the vehicle by means of relatively complicated apparatus, and Wilcox simply shows a single exposed counterweight which is bolted to the underside of the vehicle frame, in combination with relatively involved means for positioning the vehicle relative to the counterweight so that it can be bolted thereto. While such counterweighting systems may be relatively effective, it is always desirable to provide a system which maximizes, to as great an extent as possible, safety (by providing a positive support for the counterweight) and positive means for insuring proper application and removal of the counterweight along with a convenient, simple manner of use.

SUMMARY OF THE INVENTION

It is therefore an object of this invention to provide a vehicle counterweighting system which allows complete, convenient removal of the counterweighting means utilized.

It is a further object of this invention to provide a vehicle counterweighting system which, while fulfilling the above object, allows a degree of variety of the weight applied.

It is a still further object of this invention to provide a vehicle counterweighting system which, while fulfilling the above objects, provides means for carrying the counterweight means safely and stably, and provides for the safe application and removal thereof to and from the vehicle.

It is a still further object of this invention to provide a vehicle counterweighting system which, while fulfilling the above objects, is simple in design and convenient for use.

Broadly stated, the invention is to be used in a vehicle incorporating a frame, and comprises a counterweight sized to fit into an opening in a portion of the frame so as to be positioned at least partially disposed within the frame and removable from the frame portion through the opening. Support means are fixed to the frame and are in contact with the bottom portion of the counterweight to thereby support the counterweight when the counterweight is so positioned. Means are included for selectively securing the counterweight relative to the frame.

BRIEF DESCRIPTION OF THE DRAWINGS

These and other objects of the invention will become apparent from a study of the following specification and drawings, in which:

FIG. 1 is a side elevation of a vehicle incorporating the inventive counterweighting system;

FIG. 2 is an exploded perspective view of the extended frame portion of the vehicle, showing the counterweights and structure associated therewith; and, FIG. 3 is a rear elevation of a portion of the extended frame portion of the vehicle, partially broken away.

DESCRIPTION OF THE PREFERRED EMBODIMENT

Shown generally in FIG. 1 is a vehicle 10 having a forward loading end 12 and a rearward engine end 14. Such vehicle 10 includes a frame 16 having a rearwardly extending frame portion 18, as best shown in FIGS. 2 and 3. Frame portion 18 is made up of generally parallel sidewalls 20, 22 and rear end wall 24. The end wall 24 and sidewalls 20, 22 together define an opening 26.

Support means 28, 30 are associated with sidewalls 20, 22 respectively. Support means 28, 30 comprise support angle members 32, 34 fixed to the sidewalls 20, 22 inwardly thereof and running therealong. A rectangular counterweight 35 is sized to fit forwardly into the opening 26 to be positioned between the sidewalls 20, 22 and fully disposed within the frame portion 18. When the counterweight 35 is so positioned, the angle members 32, 34 are in contact with the bottom portion of the counterweight 35 so that the counterweight 35 is resting on and is supported by the angle members 32, 34. The counterweight 35 is removable rearwardly from the frame portion 18 through the opening 26. Stop members 36, 38 are fixed to sidewalls 20, 22 inwardly thereof to limit the movement of the counterweight 35 forwardly of the frame portion 18 when it is supported by angle members 32, 34, i.e., forwardly of the vehicle 10. These stop members 36, 38 determine forward location of the counterweight 35 to align apertures in the angle members 32, 34 with threaded apertures in the counterweight 35 so that the counterweight 35 may be secured in place relative to the main portion 18 by means of bolts 40. Removal of the bolts 40, of course, allows counterweight 35 to be removed rearwardly through opening 26.

Upper angle members 42, 44 are fixed to sidewalls 20, 22 respectively inwardly thereof above angle members 32, 34. These upper angle members 42, 44 extend to adjacent the ends of the angle members 32, 34 closest to the opening 26, i.e., adjacent the rearward ends of the support angle members 32, 34. The function of these upper angle members 42, 44 will now be described in detail.

The counterweight 35 is installed or removed through the use of any suitable mechanical lifting device such as a winch and cable system attached to a lifting eye (not shown) threadably inserted into a tapped hole 46 provided substantially at the center of gravity of the counterweight 35. With the counterweight 35 positioned between angle members 32 and 42, and angle members 34 and 44, there are instances during the insertion and removal process when the center of gravity of the counterweight 35 is positioned sufficiently rearwardly that the rear portion of counterweight 35 would have a tendency to drop (this is a situation where the weight of the counterweight 35 is being only partially supported by the angle members 32, 34). In such a situation, the forward portion of the counterweight 35 would have a tendency to lift up. Upper angle members 42 and 44 are positioned to contact the upper surface of the counterweight 35, and under such a condition keep the rear portion thereof from dropping, thus avoiding a relatively dangerous condition. The particular placement of upper angle members 42, 44 to extend to adjacent the rearward ends of the angle members 32, 34 insures that these upper angle members 42, 44 are in position to act upon the counterweight 35 at an early stage of entrance of the counterweight 35, and to act upon the counterweight 35 until it is almost completely removed.

Consequently, the lifting eye may be removed from tapped hole 46 after the counterweight 35 is positioned between angle members 32 and 42, and angle members 34 and 44. Likewise, the counterweight 35 may be moved rearward without danger, to the extent necessary to make tapped hole 46 accessible so that counterweight 35 may be properly carried.

A second counterweight 48 is adapted to be fixed to the extending portion 18 of frame 16 and removable therefrom by means of bolts 50 passing through apertures in the counterweight 48 and into threaded holes in end wall 24. In such fixed position, the counterweight 48 is rearward of the opening 26 and is, in fact, over the opening 26, to limit removal of the counterweight 35 positioned within extending portion 18 from that portion 18. Removal of the counterweight 48 allows access to the counterweight 35 through the opening 26 to in turn allow removal of the counterweight 35 therethrough. Such covering of the opening 26 by counterweight 48 provides another positive movement limiting means of counterweight 35 along with the already described bolts 40.

The counterweight 48 defines a recessed portion 52 and a hitching lug 54, which is rearwardly exposed when the counterweight 48 is fixed to the extending portion 18. Apertures are defined by lug 54 and a top portion of the counterweight 48 to receive a retaining pin 56 therethrough for towing purposes.

It will be seen that herein is provided a vehicle counterweighting system which allows complete removal of one or both of a pair of counterweights from the vehicle. The application and removal of such counterweights can be done, as has been pointed out, in a safe and convenient manner. Counterweight 35 is supported by positive support means upon which counterweight 35 rests. Furthermore, the safe movement of the counterweight 35 is insured by the use of upper members 42, 44 as described above. The counterweight 48 is in the position to be easily and conveniently handled, so that the overall device is effective and safe for use.

What is claimed is:

1. In a vehicle incorporating a frame, a counterweight sized to be shifted in a generally horizontal direction into an opening in a portion of the frame so as to be positioned at least partially disposed within the frame and be removable from said frame portion through said opening in a generally horizontal direction; support means fixed to the frame and in contact with the bottom portion of the counterweight to thereby support the counterweight when the counterweight is so positioned; and, means for selectively securing the counterweight relative to the frame when said counterweight is so positioned, and further comprising a second counterweight adapted to be fixed to the frame portion and removable therefrom, wherein the second counterweight is adapted to be fixed to the frame portion over the opening to limit removal of the positioned first-mentioned counterweight from said frame portion, the second counterweight being removable therefrom to allow said removal of the first counterweight from the frame portion through the opeining, wherein the first counterweight is sized to fit into said opening to be positioned fully disposed within the frame, and further including means for limiting the downward movement of the first counterweight under its own weight when said first counterweight is being fitted into said opening and into position within the frame and is being only partially supported by said support means, wherein said means for limiting downward movement of the counterweight comprise first and second upper members respectively fixed to the first and second sidewalls inwardly thereof and above the first and second support members respectively.

2. Apparatus according to claim 1 wherein the first and second upper members extend to adjacent the ends of the first and second support members respectively closest to the opening.

3. The combination according to claim 1 and further comprising load-carrying means associated with the forward end of the vehicle, wherein the frame portion comprises a rearwardly extending portion, wherein the opening allows removal of the first counterweight rearwardly of the rearwardly extending portion, and wherein the second counterweight is fixed to the rearwardly extending portion rearwardly of the opening thereof.

4. Apparatus according to claim 1 and further comprising rearwardly-exposed hitching means defined by the second counterweight.

* * * * *